(12) United States Patent
Quansah

(10) Patent No.: US 10,691,724 B2
(45) Date of Patent: Jun. 23, 2020

(54) VIRTUAL INTEGRATION COMMAND SYSTEM

(71) Applicant: Doreen Quansah, Leominster, MA (US)

(72) Inventor: Doreen Quansah, Leominster, MA (US)

(*) Notice: Subject to any disclaimer, the term of this patent is extended or adjusted under 35 U.S.C. 154(b) by 243 days.

(21) Appl. No.: 15/818,302

(22) Filed: Nov. 20, 2017

(65) Prior Publication Data

US 2018/0349464 A1 Dec. 6, 2018

Related U.S. Application Data

(63) Continuation of application No. 15/613,206, filed on Jun. 3, 2017, now abandoned.

(51) Int. Cl.
| | |
|---|---|
| *G06F 16/20* | (2019.01) |
| *G06F 16/28* | (2019.01) |
| *G02B 27/01* | (2006.01) |
| *G06T 19/00* | (2011.01) |
| *G06F 16/332* | (2019.01) |
| *G06F 16/242* | (2019.01) |
| *G06F 16/26* | (2019.01) |
| *G06Q 50/00* | (2012.01) |

(52) U.S. Cl.
CPC ......... *G06F 16/284* (2019.01); *G02B 27/017* (2013.01); *G06F 16/2428* (2019.01); *G06F 16/26* (2019.01); *G06F 16/3328* (2019.01); *G06T 19/003* (2013.01); *G06Q 50/01* (2013.01)

(58) Field of Classification Search
CPC .... G06F 16/2428; G06F 16/26; G06F 16/284; G06F 16/3328; G02B 27/017
USPC .......................................................... 707/765
See application file for complete search history.

(56) References Cited

U.S. PATENT DOCUMENTS

| | | | | |
|---|---|---|---|---|
| 5,956,028 | A * | 9/1999 | Matsui | G06F 3/1454 345/419 |
| 6,377,263 | B1 * | 4/2002 | Falacara | G06N 3/006 345/473 |
| 8,405,680 | B1 * | 3/2013 | Cardoso Lopes | G06T 19/00 345/426 |
| 9,092,898 | B1 * | 7/2015 | Fraccaroli | G06T 19/006 |
| 9,412,205 | B2 * | 8/2016 | Mullins | G06T 19/006 |
| 2016/0328886 | A1 * | 11/2016 | Tong | G06T 13/40 |

* cited by examiner

*Primary Examiner* — Vincent F Boccio
(74) *Attorney, Agent, or Firm* — Mark Terry

(57) ABSTRACT

The system, for facilitating access to data in a database, includes a computing device communicatively coupled with a communications network and with the user interface, the computing device configured for transmitting the database query over the communications network; a server communicatively coupled with the communications network, the server configured for: a) receiving the database query transmitted by the computing device, and storing the database query in association with a user record corresponding to the user; b) accessing the database to retrieve responsive data from the database in response to the database query; c) processing the responsive data to produce a virtual 3D image of the responsive data, wherein the 3D virtual image is configured to be manipulated by the user; d) transmitting the 3D image of the responsive data to the computing device over the communications network.

8 Claims, 1 Drawing Sheet

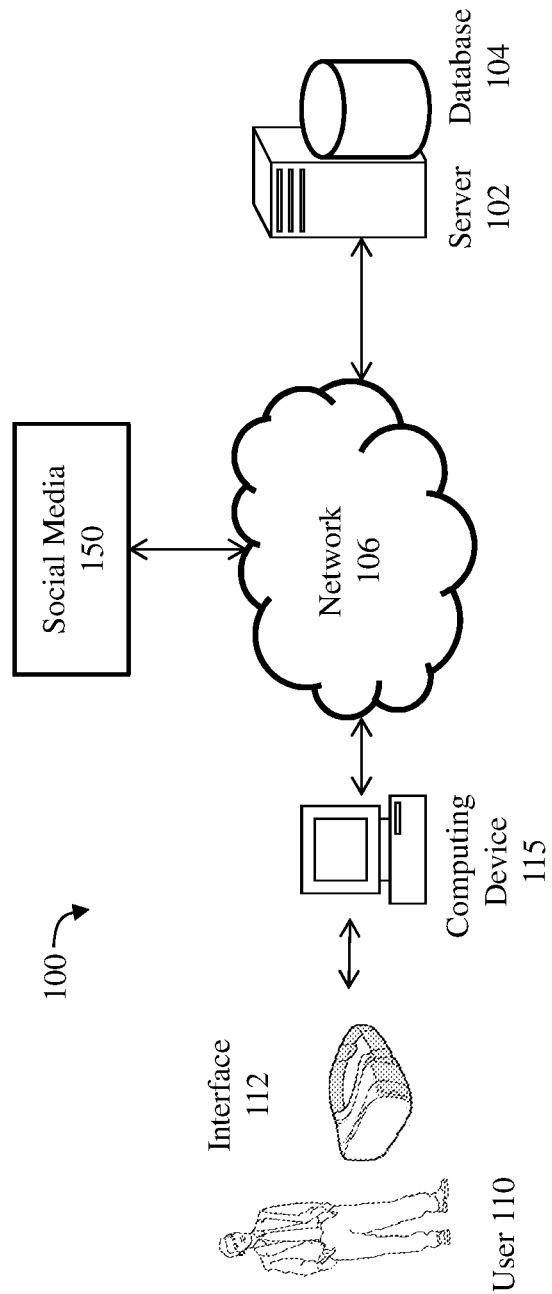

VIRTUAL INTEGRATION COMMAND SYSTEM

CROSS-REFERENCE TO RELATED APPLICATIONS

This application is a continuation in part of, and claims priority to, application Ser. No. 15/613,206 filed Jun. 3, 2017. The subject matter of application Ser. No. 15/613,206 is hereby incorporated by reference in its entirety.

TECHNICAL FIELD

The technical field relates generally to information technology and, more specifically, relates to systems and processes for improving access to information and transmitting them to learning and teaching information.

BACKGROUND

The disclosed invention relates generally to accessing information in a database or databases and more particularly to techniques for providing 3D interface for providing answers to user queries using a database system.

Students, workers, business managers and staff require information to perform their work and run their companies. Data processing departments have been attempting to meet this information need for over 50 years. An abundance of data of all kinds resides on the central computers of academic, public and provide organizations. All this data is available for review by users of such entities, but in practice, however, users of such information have faced serious obstacles in retrieving the information they need.

A frequent response to a user's request for data from a database is that the data is not stored in a way that enables it to be used to meet a user's need. Additionally, the complexity of current database systems requires a trained specialist to figure out how the data requested by a user can be retrieved from the database. This specialist must interpret the user's request or "query", determine exactly what it is the user is looking for, and figure out how to get that information from the database. Then, once the data is retrieved, it must be formatted into a report that the user can use and understand.

Therefore, there is a need for improvements in the prior art, and specifically for an improved method and system for providing answers to user queries using a database system.

SUMMARY

A method and system for facilitating access to data in a database is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The system comprises a computing device communicatively coupled with a communications network and with the user interface, the computing device configured for transmitting the database query over the communications network; a server communicatively coupled with the communications network, the server configured for: a) receiving the database query transmitted by the computing device, and storing the database query in association with a user record corresponding to the user; b) accessing the database to retrieve responsive data from the database in response to the database query; c) processing the responsive data to produce a virtual 3D image of the responsive data, wherein the 3D image is configured to be manipulated by the user; d) transmitting the 3D image of the responsive data to the computing device over the communications network; wherein the user interface is further configured for receiving the 3D image of the responsive data and displaying the virtual 3D image for review by the user, wherein 3D image is configured to be manipulated by the user.

BRIEF DESCRIPTION OF THE DRAWINGS

The accompanying drawings, which are incorporated in and constitute a part of this disclosure, illustrate various example embodiments. In the drawings:

FIG. 1 is a diagram of an operating environment that supports a method and system for providing virtual 3D database information, according to an example embodiment.

DETAILED DESCRIPTION

The following detailed description refers to the accompanying drawings. Wherever possible, the same reference numbers are used in the drawings and the following description to refer to the same or similar elements. While embodiments herein may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments improve upon the problems with the prior art by providing a system and method for allowing a database user to access and view data from a database using virtual 3D viewing technology. The disclosed embodiments allow a user to assess data from a database remotely, while providing the requested information in a 3D format that is easy to understand for the user. Thus, the disclosed embodiments allow a user accessing a database to have a full and accurate picture of the data requested from the database in a virtual format.

FIG. 1 is a block diagram of an operating environment 100 that supports a process for providing 3D database information via a server 102 communicatively coupled with a communications network 106, according to an example embodiment. The environment 100 may comprise at least one computing device 115 and a server 102 communicating via a communications network 106. The computing device 115 may be connected either wirelessly or in a wired or fiber optic form to the communications network 106. The environment 100 may further comprise at least one user interface 112 communicatively coupled, either wirelessly or in a wired or fiber optic form to the computing device 115. Communications network 106 may be a packet switched network, such as the Internet, or any local area network, wide area network, enterprise private network, cellular network, phone network, mobile communications network, or any combination of the above.

Interface 112, computing device 115 and server 102 may each comprise a computing device such as a computer. In one embodiment, user interface 112 may include displays, cameras, microphones, infrared sensors, multi-camera arrays, and the like, all of which records the activity and input provided by a user 110. Interface 112 is configured for collecting real-time data from a user, wherein the real-time data includes video data, audio data, infrared data and 3D data. Further, interface 112 and computing device 115 may each comprise mobile computing devices such as cellular telephones, smart phones, tablet computers, or other computing devices such as a desktop computer, laptop, game console, etc. In one embodiment, the interface 112 may be integrated with computing device 115.

Server 102 includes a software engine that delivers applications, data, program code and other information to networked device 115. The software engine of server 102 may perform other processes such as transferring multimedia data, such as audio and video, in a stream of packets that are interpreted and rendered by a software application as the packets arrive. It should be noted that although FIG. 1 shows only one computing device 115, the system of the present invention supports any number of computing devices connected via network 106.

Server 102, and computing device 115 may each include program logic comprising computer source code, scripting language code or interpreted language code that perform various functions of the present invention. In one embodiment, the aforementioned program logic may comprise a program module.

FIG. 1 further shows that server 102 includes a database or repository 104, which may be a relational database comprising a Structured Query Language (SQL) database stored in a SQL server. Computing device 115 may also include databases. The database 104 may serve data used by server 102, computing device 115, during the course of operation of the invention.

Environment 100 may be used when computing device 115, transfer data to and from database 104 coupled to server 102. Various types of data may be stored in the database 104 of server 102. For example, the database 104 may store one or more user records for each user, i.e., a user record. A user record may include personal data for the user 110, which may include contact information for a user 110, demographic data, etc.

A user record may also include real-time data about a user providing a database query, including video data, audio data, infrared data and 3D data. Additionally, a user record may include 3D holographic image previously served to the user.

Note that although server 102 is shown as a single and independent entity, in one embodiment, the functions of server 102 may be integrated with another entity, such as the computing device 115. Further, server 102 and its functionality, according to a preferred embodiment, can be realized in a centralized fashion in one computer system or in a distributed fashion wherein different elements are spread across several interconnected computer systems.

The system 100 works as follows. The user interface 112 collects a database query from the user 110. The database query may be provided, for example, by speaking the query or typing the query into a keyboard. Next, the device 115 transmits the database query over the communications network 106 to the server 102. Then, the server 102 receives the database query transmitted by the computing device 115, and stores the real-time data in association with a user record corresponding to the user. Next, the server 102 accesses the database 104 to retrieve responsive data from the database 104 in response to the database query. The responsive data is processed by server 102 to produce a 3D virtual display image of the responsive data, wherein the 3D image is configured to be manipulated by the user 110. The server 102 transmits the 3D image of the responsive data to the computing device 115 over the communications network 106, wherein the user interface 112 is further configured for receiving the 3D image of the responsive data and displaying the 3D virtual display for review by the user 110, wherein 3D image is configured to be manipulated by the user. 3D virtual image data may include any form of 3D data acquisition and reconstruction data, as well as 3D modelling data that may be created.

Interface 112 may be configured to read and output 3D user interaction. In 3D user interaction the user interacts with a computer or other device with an aspect of three-dimensional space. The interface acts as the intermediary between human and machine. The 3D space used for interaction can be the real physical space, a virtual space representation simulated in the computer, or a combination of both. When the real physical space is used for data input, the human interacts with the machine performing actions using an input device that should know the relative position and distance of the user action, among other things. When it is used for data output, the simulated 3D virtual scene is projected onto the real environment through one output device. The interface 112 may be 3D user interface output hardware (such as 3D visual audio and haptic displays), and 3D user interface input hardware (such as microphones, input devices and tracking devices).

In one embodiment, a programmed algorithm, such as a heuristic algorithm, may reside on server 102. The purpose of the algorithm is to read the database query of the user 110 and seek the requested data from the database 104. A heuristic algorithm is a function that ranks alternatives in search algorithms at each branching step based on available information to decide which branch to follow. The heuristic algorithm achieves its goals by trading optimality, completeness, accuracy, or precision for speed. The heuristic algorithm is also used to create the 3D data described above. In this way, the algorithm is used to create new 3D data that corresponds to the database query provided by the user 110.

In another embodiment, the system 100 may include an interface to the user's 110 social media page or pages. In this embodiment, social media entity 150 receives any of the data that is transmitted back and forth between the user 110 and the server 102, including the database query and the 3D image data. Said data sent to social media entity 150 may then be posted to the user's 110 social media pages for her friends or acquaintances to view.

Embodiments herein, for example, are described above with reference to block diagrams and/or operational illustrations of methods, systems, and computer program products according to embodiments herein. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments herein have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for facilitating access to data in a database, the system comprising:
    a user interface for collecting a database query from a user;
    a computing device communicatively coupled with a communications network and with the user interface, the computing device configured for transmitting the database query over the communications network;
    a server communicatively coupled with the communications network, the server configured for:
        a) receiving the database query transmitted by the computing device, and storing the database query in association with a user record corresponding to the user, wherein the user record comprises a 3D holographic image previously served to the user, video data, audio data, infrared data, and 3D data;
        b) accessing the database to retrieve responsive data from the database in response to the database query;
        c) processing the responsive data to produce a 3D image of the responsive data, wherein the 3D image is configured to be manipulated by the user;
        c) transmitting the 3D image of the responsive data to the computing device over the communications network;
    wherein the user interface is further configured for receiving the 3D image of the responsive data and displaying the 3D image for review by the user, wherein 3D image is configured to be manipulated by the user.

2. The system of claim 1, wherein the user interface is a head mounted 3D display system.

3. The system of claim 2, wherein the computing device comprises a smart phone communicatively coupled with the communications network.

4. The system of claim 3, further comprising a database communicatively coupled with the server, wherein the database is used to store the responsive data and the 3D image of the responsive data.

5. The system of claim 4, wherein the communications network comprises the Internet.

6. The system of claim 5, wherein the 3D image comprises a 3D holographic image.

7. The system of claim 6, wherein the database is a relational database.

8. The system of claim 1, wherein accessing the database to retrieve responsive data from the database in response to the database query further comprises utilizing a heuristic algorithm.

* * * * *